United States Patent [19]

Rabii

[11] Patent Number: 5,018,013

[45] Date of Patent: May 21, 1991

[54] PROGRAMMABLE AUDIO/VIDEO SIGNAL INTERFACE

[75] Inventor: Khosro M. Rabii, Arlington Heights, Ill.

[73] Assignee: Zenith Electronics Corporation, Glenview, Ill.

[21] Appl. No.: 454,552

[22] Filed: Dec. 21, 1989

[51] Int. Cl.⁵ .............................................. H04N 5/268
[52] U.S. Cl. ................................................... 358/181
[58] Field of Search ................. 358/181, 185, 188, 22, 358/86

[56] References Cited

U.S. PATENT DOCUMENTS

| | | | |
|---|---|---|---|
| 4,581,645 | 4/1986 | Beyers, Jr. | 358/181 |
| 4,821,101 | 4/1989 | Short | 358/181 |
| 4,907,079 | 3/1990 | Turner | 358/181 |

Primary Examiner—Tommy P. Chin

[57] ABSTRACT

A switching interface couples a plurality of video and audio signals from different sources to a single pair of audio outputs and a video output via a plurality of switches. A three wire serial data bus supplies the interface, which includes a serial to parallel converter, an address decoder, a data decoder and a control decoder for developing and applying appropriate switching control signals. A plurality of programmable gain amplifiers are provided for controlling the gain characteristics of the output video signals.

7 Claims, 5 Drawing Sheets

PROGRAMMABLE AUDIO/VIDEO SIGNAL INTERFACE

BACKGROUND OF THE INVENTION AND PRIOR ART

This invention relates generally to audio/video (A/V) switches and specifically to an interface that provides universal audio/video switching for use with analog and digital television receivers (TVs), video cassette recorders (VCRs) and the like.

Many modern television receivers are microprocessor based with the functions previously performed by analog potentiometers and switches being accomplished electronically. Additionally, a television receiver or an audio/video center may be capable of accepting audio and video signals from a plurality of different sources and providing one or more video outputs for display on a cathode ray tube (CRT) and a single set of stereo audio signals for reproduction by appropriate audio equipment. The video signals may be received from a broadcast receiving antenna, a cable network or from auxiliary devices such as video cassette recorders, video cameras, video disk players, and auxiliary television systems. The various audio inputs may likewise stem from a variety of sources including the above and separate RGB systems and microphone inputs.

A television receiver manufacturer may have a variety of TV receiver models based on different technologies, e.g. analog and digital, and incorporating widely diverse features. One such feature is picture-in-picture (PIP), which enables one or more video display windows to simultaneously display video images different from the main image. This enables a viewer to simultaneously view a given program (the main image) and to monitor one or more other programs displayed in the windows. The PIP feature is provided by undersampling the other video signals which develops a relatively coarse display. As will be seen, one aspect of the invention is to provide an audio/video switching unit capable of interfacing a wide variety of TV receiver models including numerous different features. For example, the interface includes a built in summation circuit for accepting SVHS luma (Y) and SVHS chroma (C) signals and combining them to form a composite video signal (CV) at an output of the interface for application to a PIP processor. Combining the two signals in the interface obviates the need for an additional external analog to digital (A/D) converter to sample the separate Y and C signals. This permits a significant cost reduction and because the wider bandwidth Y and C signals in the SVHS format cannot be utilized effectively in a PIP display, involves no detriment to the viewer. In another TV receiver model, the CV signal provided at the same interface output may be used for a different purpose, e.g. application to a comb filter.

As mentioned above, TV manufacturers often have digital as well as analog receivers in their product lines. It would be desirable to provide a single universal interface, preferably in integrated circuit chip form, for use with such digital and analog systems. The interface would preferably be programmable such that different inputs could selectively be provided at the outputs of the interface, with the signal levels or gains of the output signals being adjustable, as desired. The programmable gain control amplifiers in the outputs of the interface enable signal level variations to be easily adapted to a variety of end use apparatus.

The interface is designed to be controlled over a three line serial data bus and includes an address decoder, a data decoder (and latch) and a control signal decoder. The control signals control the various electronic switches in the interface for switching the audio and video signals under control of a microprocessor or the like in a television receiver or other control device.

With the system of the invention, a very flexible and economical audio/video signal interface is provided. The interface of the invention may be incorporated in a television receiver or other device or supplied as a stand-alone switching unit that is couplable to such other devices.

OBJECTS OF THE INVENTION

A principal object of the invention is to provide a novel audio/video signal interface.

Another object of the invention is to provide an audio/video signal interface that is usable with a wide variety of signals from different apparatuses.

Another object of the invention is to provide an audio video signal interface that may be readily integrated into an audio/video device or manufactured as a separate system.

A feature of the invention is the provision of programmable amplifiers in the video outputs of the interface for enabling control of signal levels as required.

Another feature of the invention resides in the provision of a plurality of external control signals for controlling different aspects of auxiliary apparatus.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
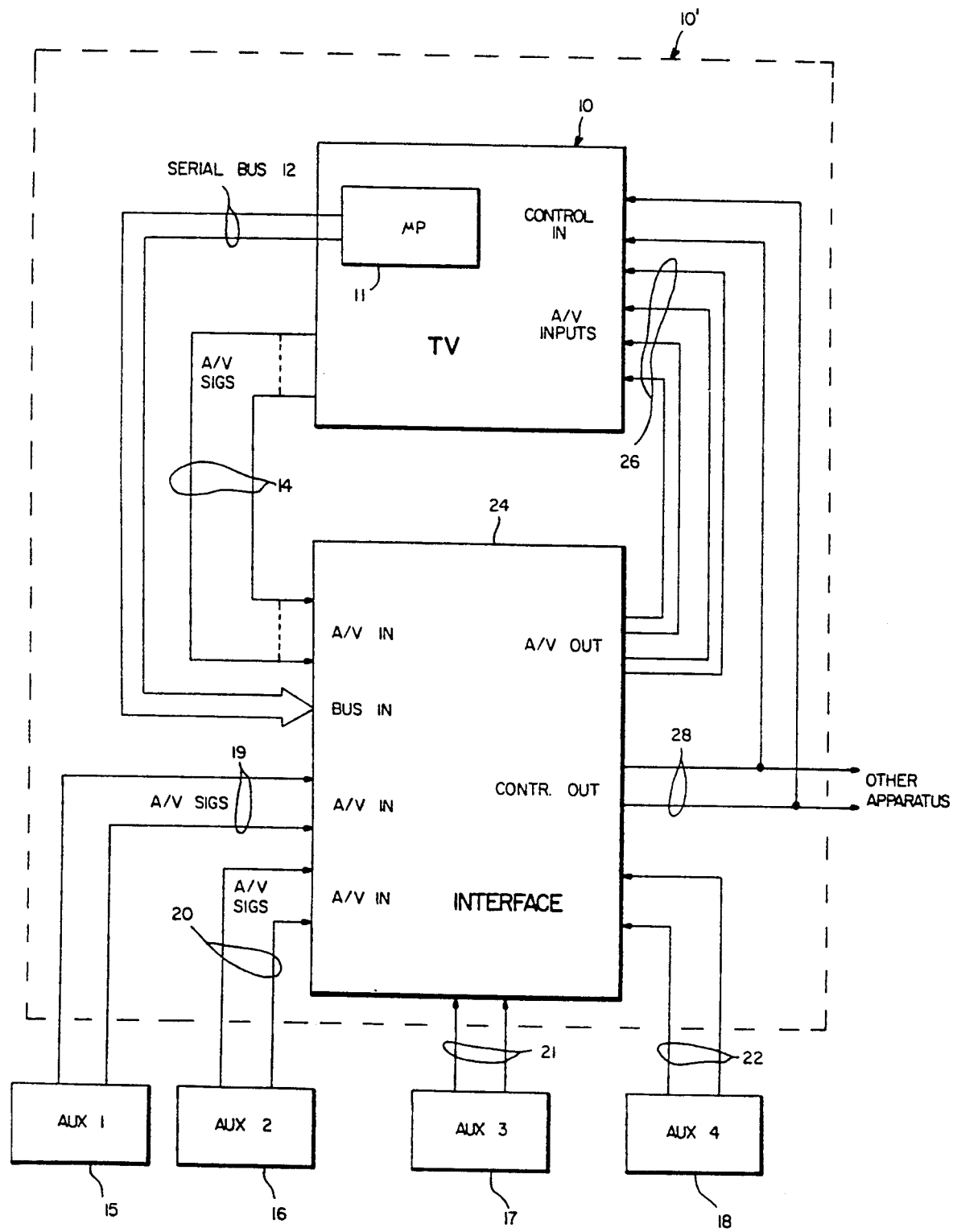
FIG. 1 is a simplified block diagram showing interconnection of the interface of the invention with a plurality of auxiliary A/V devices.

As mentioned, the A/V signal interface of the invention may be constructed in a stand-alone configuration or may be incorporated within a television receiver or other A/V device. As shown in FIG. 1, a television receiver is generally identified by reference numeral 10 and is separate from interface 24. As indicated by the dashed line block 10', TV 10 and interface 24 may be integrated together. It will be appreciated that the TV 10 is illustrative only in that the interface 24 could be incorporated in a VCR, a monitor or the like with equal facility. A microprocessor 11 in TV 10 supplies a serial bus 12 which is coupled to interface 24. A plurality of A/V signals on input leads 14 is also supplied from TV 10 to interface 24. A group of auxiliary sources 15, 16, 17 and 18 also are shown as providing A/V signals to interface 24 via lead groups 19, 20, 21 and 22, respectively. Interface 24 provides A/V outputs to TV 10 over a plurality of leads 26. A plurality of control outputs are supplied from interface 24 over a plurality of leads 28 to TV 10 and also to other external devices (not shown). It will thus be seen that the interface 24 represents a very generalized switching arrangement for switching a plurality of A/V inputs from a number of sources to a single group of audio/video outputs and control outputs. The actual switching is accomplished in response to signals from microprocessor 11 on the serial data bus 12.

Figure 2:
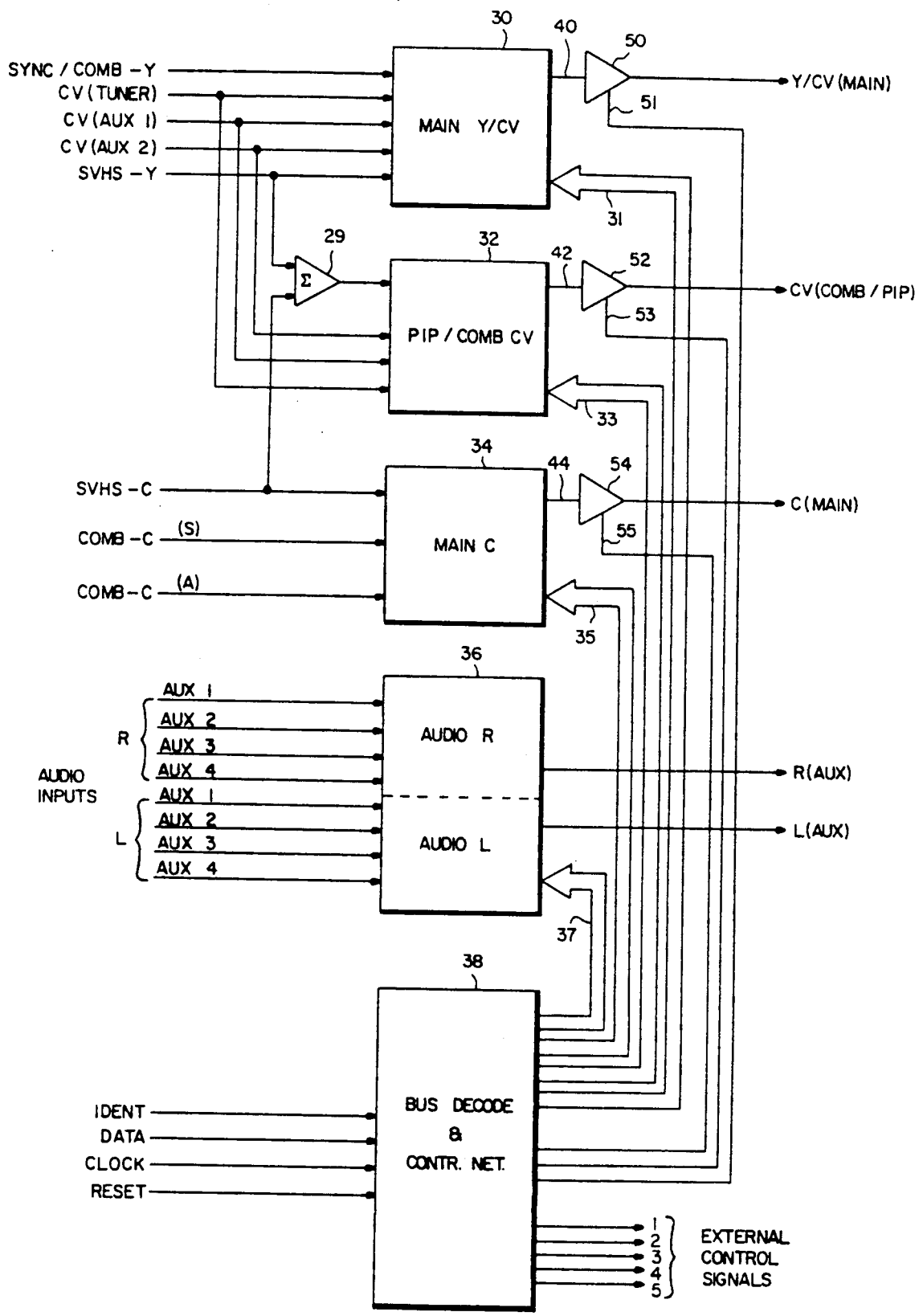
FIG. 2 is a block diagram of the interface of the invention arranged for use with a digital television receiver.

In FIG. 2, interface 24 is shown in detail as it may be used in a digital TV. A main Y/CV switch bank 30 is coupled to a bus decode and control network (control) 38 via a control bus 31. A plurality of video signal inputs are provided to switch bank 30 and a single output is supplied over a lead 40 to a programmable video signal amplifier 50. Programmable amplifier 50 is controlled over lead 51 from control 38. Exemplary inputs are: a sync/comb-Y signal; a composite video (CV) tuner; two other composite video signals from auxiliary CV sources and a SVHS-Y signal. A PIP/comb CV switch bank 32 is supplied with the same CV signals supplied to main Y/CV switch bank 30. Switch bank 32 is also supplied with the output of a summer 29 that has the SVHS-Y signal as one input. Switch bank 32 is controlled over control bus 33 from control 38 and provides a single output on a lead 42 that is connected to a programmable amplifier 52, which is gain controllable from control 38 via a lead 53. The output of programmable amplifier 52 is a composite video signal that may be applied to a comb filter or to a PIP processor (neither of which are shown). A chroma signal switch bank 34 is labelled Main C and has inputs adapted for receiving an SVHS-C signal and two other chroma signals. When used with an analog TV the two other inputs may comprise a symmetric combed chroma signal and an asymmetric combed chroma signal. In the case of a digital TV, the two other inputs are unconnected. The SVHS-C signal is also supplied as the second input of summer 29, which thereby provides a CV input to switch bank 32. The output of switch bank 34 is supplied over a lead 44 to a programmable amplifier 54 that is gain controllable over a lead 55 by control 38. Control 38 supplies appropriate switching signals to switch bank 34 via control bus 35.

The three video switch banks 30, 32 and 34 for the video signal inputs complete signal pathways between the selected one of their inputs and their respective outputs. These signal pathways have programmable gain characteristics which are controllable by the programmable amplifiers therein such that an input signal is selected and provided to the switch bank output at a level that is predetermined. The summer 29 combines the separate Y and C signals from an SVHS source and makes it available in combined form at the output of switch bank 32, and at a predetermined level at the output of programmable amplifier 52. As mentioned, undersampling of the signal is required for PIP processing and combining the Y and C signals saves an A/D converter.

The audio inputs are grouped as right and left signals from auxiliary inputs 1, 2, 3 and 4. These inputs supply an audio switch bank 36 which has a right section and a left section for producing a right auxiliary output and a left auxiliary output, respectively, depending upon the selection made by control 38 over control bus 37.

The serial bus 12 is a three line bus and includes an Ident line, a Data line and a Clock line. Serial bus 12 is coupled to control 38 where the appropriate addresses and data on the bus are decoded for developing the switching signals for application along control buses 31, 33, 35 and 37. Additionally, the gain control signals for application to leads 51, 53 and 55 for controlling programmable amplifiers 50, 52 and 54, respectively, and the five external control signals for controlling the various external devices (not shown) are supplied from control 38. The external devices may, for example, comprise RF type relays for input source switching.

Figure 3:
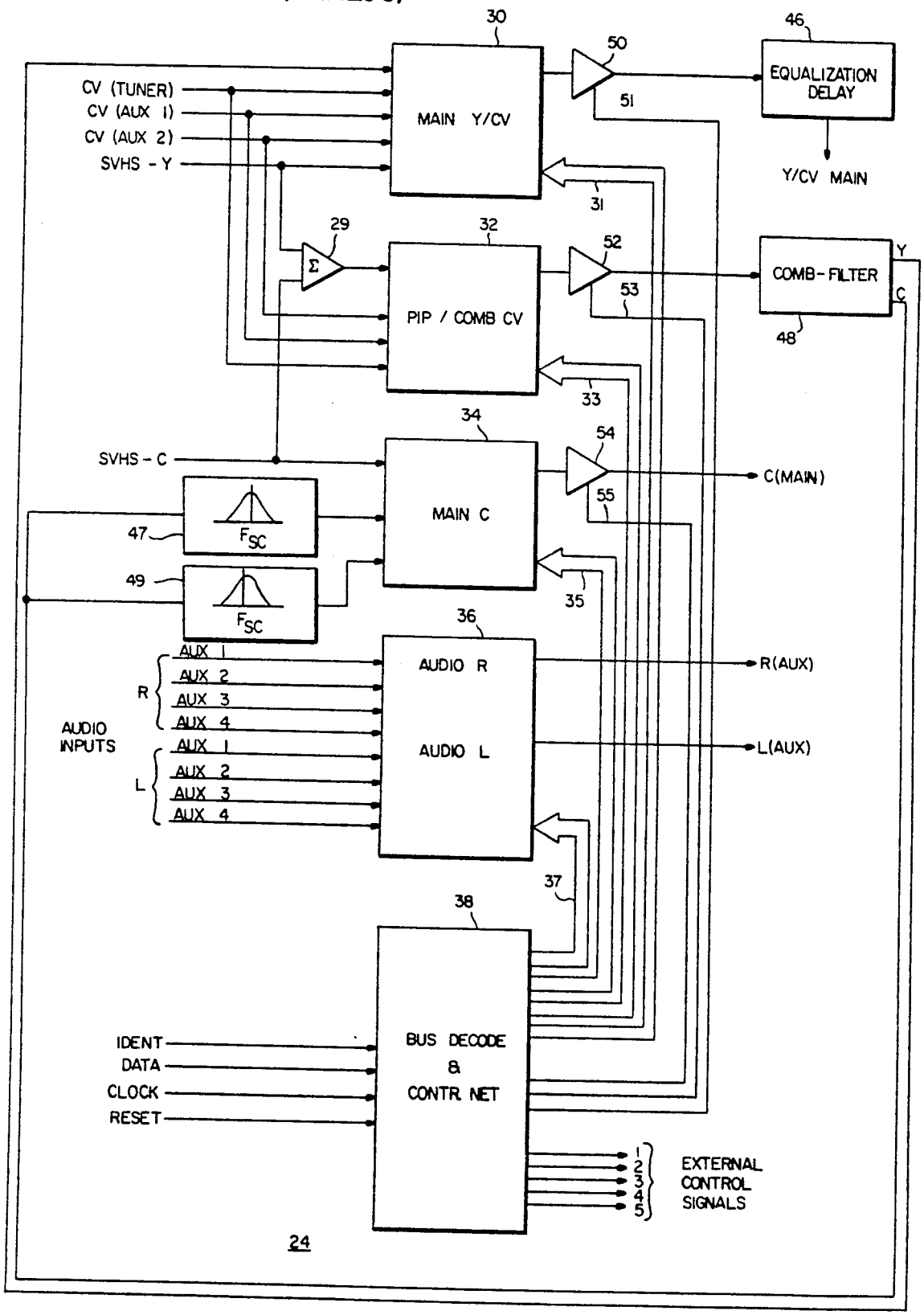
FIG. 3 is a partial block diagram of the inventive interface arranged for use with an analog television receiver.

In FIG. 3, an analog TV implementation using the interface 24 of the invention is shown. The interface 24 is identical to that of FIG. 2 as is illustrated by the like reference characters. The differences between FIG. 3 and FIG. 2 are in the external provision of an equalization delay circuit 46 coupled to the output of programmable amplifier 50 for developing the Y/CV main image signal and a comb filter 48 coupled to the output of programmable amplifier 52. Separate Y and C signals are developed in the output of comb filter 48 and are coupled back to a pair of bandpass circuits 47 and 49 of differing response characteristics. Bandpass 49 corrects for the roll off of a chroma signal that is processed in a conventional tuner-IF system. Such a chroma signal is denominated as asymmetrical. Signals from sources such as tapes do not experience such a chroma roll-off. The appropriately processed chroma signal is selected by control 38 for best frequency response depending upon the input source of the chroma signal. The frequency circuit response of bandpass circuit 47 is uniform about the chroma carrier and bandpass 47 is used for chroma signals that have been derived from a symmetric source, such as a comb filter or a tape. The provision of the bandpass circuits 47 and 49 provides a TV manufacturer with flexibility in tailoring the output chroma signal to compensate for the source of the chroma signal. The equalization delay 46 provides a delay in the Y/CV output signal to compensate for the processing delay due to the comb filter and bandpass circuits.

Figure 4:
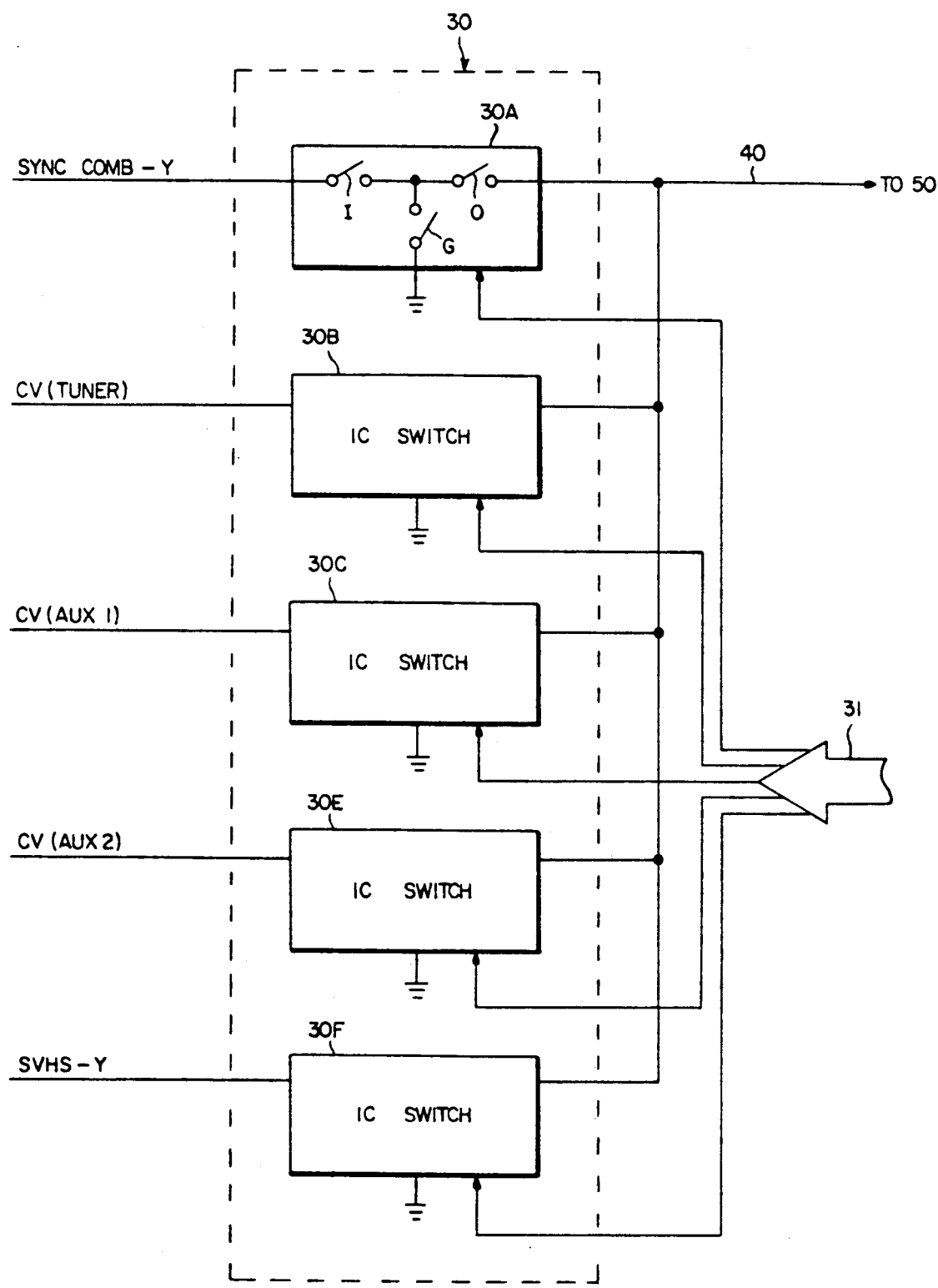
FIG. 4 illustrates the switching arrangement of the video switches in the interface for providing isolation.

In FIG. 4, switch bank 30 (which is representative of the other switch banks) is diagrammatically illustrated as a plurality of switching elements 30A-30F. Switch 30A is schematically indicated as a series connection of an input switch I, an output switch O and a ground switch G connected to the junction of switches I and O. Control bus 31 is shown as supplying control signals for controlling the operation of switches 30A-30F which all connect to a common output lead 40 that is coupled to programmable amplifier 50. When an input signal, e.g. sync comb-Y, is selected, its switch I and switch 0 are closed and its switch G is opened. All other switches 30B-30E have I and O open and G closed—which is the normal unselected condition. If no input is selected, all I's are open and all O's and all G's are closed. This arrangement maximizes the isolation of the switches from each other in an integrated circuit environment. The switches are all operated under the control of signals on control bus 31.

Figure 5:
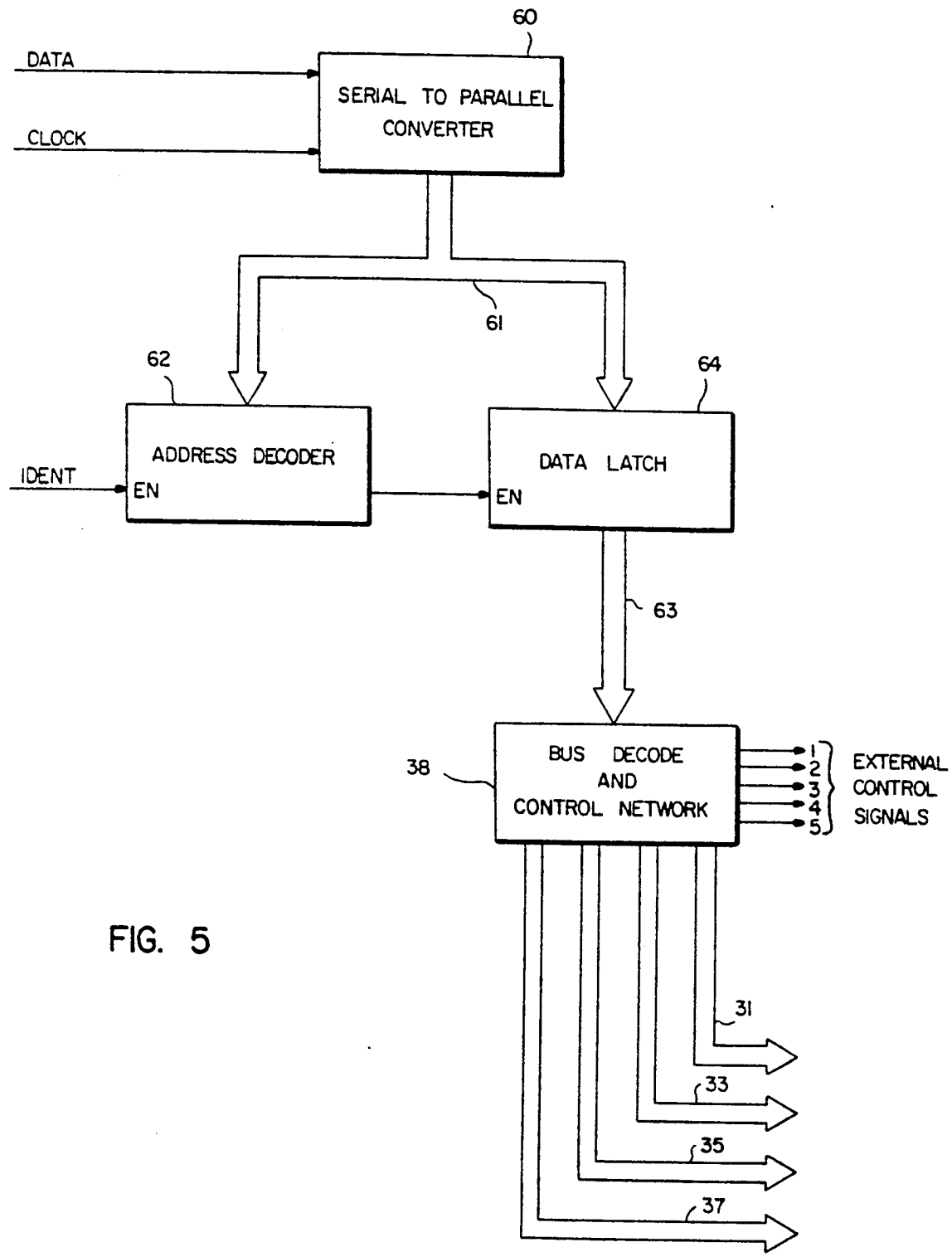
FIG. 5 is a partial block diagram of the bus decoder system used in the interface of the invention.

In FIG. 5, a block diagram of a three line serial bus decoder is shown. A serial to parallel converter 60 is supplied with Data and Clock signals and in turn supplies signals over a bus 61 to an address decoder 62 and to a data latch 64. The Ident signal line is coupled to the enable input of address decoder 62 and the output of address decoder 62 is coupled to the enable input of data latch 64. The output of data latch 64 is supplied over a bus 63 to bus control and decode network 38 which supplies control buses 31, 33, 35 and 37 and the five external control signals. In the serial data bus 12, the Ident line identifies when data is being sent and when an address is being sent. The address or data is clocked in under control of the Clock line. For example, when the Clock line indicates the beginning of a transmission, the first group of bits represent an address and the second group of bits represent data. The identification of address or data is the function of the Ident line. When the appropriate address is decoded by address decoder 62, data latch 64 is enabled to receive (and latch) the clocked in data on the Data line. The decoder in control 38 operates in accordance with well known techniques for developing the appropriate switching signals and external control signals.

What has been described is a novel audio/video switch arrangement that provides for selection of a plurality of audio and video input signals and includes programmable amplifiers for providing the output video signals at predetermined levels. Separate Y and C input signals are internally combined for use with a PIP processor thereby saving a sampling A/D converter. It is recognized that numerous changes and modifications in the described embodiment of the invention will be apparent to those skilled in the art without departing from its true spirit and scope. The invention is to be limited only as defined in the claims.

What is claimed is:

1. A programmable audio/video signal interface comprising:
   switching means including a plurality of groups of signal input terminals and a plurality of outputs;
   a plurality of programmable gain means coupled to selected ones of said plurality of outputs respectively and supplying output terminals;
   digitally operated control means operatively connected to said switching means and to said programmable gain means for establishing signal connecting pathways between selected ones of said input terminals and said output terminals and for establishing the gain characteristics of said pathways; and
   a data bus coupled to said control means for conveying digital commands for selecting among said signal connecting pathways and said pathway gain characteristics.

2. The interface of claim 1 wherein said data bus is couplable to a microprocessor controlled three wire serial data bus.

3. The interface of claim 1 wherein ones of said plurality of groups of signal input terminals are adapted to be supplied with SVHS luma signals, SVHS chroma signals, composite video signals and chroma signals and others of said plurality of groups are supplied with audio signals and wherein said output terminals supply right and left audio signals and one or more chroma signals, luma signals and composite video signals.

4. The interface of claim 3 further including combining means for receiving inputs of said SVHS luma signals and said SVHS chroma signals and combining them in the form of a composite video signal for use as a PIP signal.

5. The interface of claim 2 wherein said switching means further include means for substantially grounding said output when signal pathways are not established therethrough.

6. An audio/video switch for a television signal comprising:
   a plurality of composite video signal and luma signal input terminals;
   a chroma signal input terminal;
   a programmable gain main video amplifier;
   a programmable gain second video amplifier;
   a plurality of stereo audio input terminals;
   a main video output terminal coupled to said programmable gain main video amplifier;
   a second video output terminal coupled to said programmable gain second video amplifier;
   a pair of stereo audio output terminals;
   a main video signal witch bank coupling said programmable gain main video amplifier to said composite video input terminals;
   a second video signal switch bank coupling said programmable gain second video amplifier to said composite video input terminals;
   an audio switch bank coupled between a selected pair of said stereo input terminals and said pair of stereo audio output terminals; and
   control means having a serial data bus input and a plurality of outputs coupled to said main video signal switch bank and said second video signal switch bank and to said programmable gain main video amplifier and said programmable gain second video amplifier.

7. The switch of claim 6, further including:
   a chroma input terminal and a chroma output terminal;
   a chroma switch bank having an input coupled to said chroma input terminal;
   a programmable gain chroma amplifier coupled between said chroma switch bank and said chroma output terminal; and
   a summation circuit having input coupled to said luma and chroma signal input terminals and an output coupled to said second video signal switch bank.

* * * * *